(12) United States Patent
Nakamura et al.

(10) Patent No.: US 10,712,067 B2
(45) Date of Patent: Jul. 14, 2020

(54) AIR-CONDITIONING APPARATUS (71) Applicant: Mitsubishi Electric Corporation, Tokyo (JP)

(72) Inventors: Toshinori Nakamura, Tokyo (JP); Takuya Mukoyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 19 days.

(21) Appl. No.: 16/076,799

(22) PCT Filed: Apr. 25, 2016

(86) PCT No.: PCT/JP2016/062894
§ 371 (c)(1),
(2) Date: Aug. 9, 2018

(87) PCT Pub. No.: WO2017/187476
PCT Pub. Date: Nov. 2, 2017

(65) Prior Publication Data
US 2019/0063806 A1 Feb. 28, 2019

(51) Int. Cl.
*F25B 49/02* (2006.01)
*F24F 11/89* (2018.01)

(52) U.S. Cl.
CPC ........... *F25B 49/022* (2013.01); *F24F 11/89* (2018.01); *F25B 2600/025* (2013.01); *F25B 2600/0251* (2013.01); *F25B 2600/0253* (2013.01); *F25B 2600/23* (2013.01); *F25B 2700/21* (2013.01); *F25B 2700/2104* (2013.01)

(58) Field of Classification Search
CPC .............. F25B 49/022; F25B 2600/025; F25B 2600/0251; F25B 2600/0253; F25B 2700/2104
See application file for complete search history.

(56) References Cited

U.S. PATENT DOCUMENTS

| 5,088,646 | A | * | 2/1992 | Yamagishi | .............. F24D 15/04 237/2 B |
| 2017/0328621 | A1 | * | 11/2017 | Nagae | ....................... F24F 11/89 |
| 2019/0257564 | A1 | * | 8/2019 | Koshi | ....................... F25B 1/00 |

FOREIGN PATENT DOCUMENTS

| JP | S56-020942 A | 2/1981 |
| JP | S64-075849 A | 3/1989 |

(Continued)

OTHER PUBLICATIONS

Office Action dated Jul. 30, 2019 issued in corresponding JP patent application No. 2018-513950 (and English translation).

(Continued)

*Primary Examiner* — Marc E Norman
(74) *Attorney, Agent, or Firm* — Posz Law Group, PLC (57) ABSTRACT

An air-conditioning apparatus includes a refrigeration cycle in which a compressor, an outdoor heat exchanger, an expansion valve, and an indoor heat exchanger are connected in a circuit and is provided with an indoor air temperature sensor configured to detect indoor air temperature in a space in which the air-conditioning apparatus is installed, and a controller configured to control a rotation speed of the compressor. The controller controls operation of the compressor based on an operation state of the compressor and a change amount of the indoor air temperature detected by the indoor air temperature sensor at a set time interval.

6 Claims, 7 Drawing Sheets

(56) References Cited

FOREIGN PATENT DOCUMENTS

| | | |
|---|---|---|
| JP | 2006-258388 A | 9/2006 |
| JP | 2008-196766 A | 8/2008 |
| JP | 2016-053451 A | 4/2016 |

OTHER PUBLICATIONS

International Search Report of the International Searching Authority dated Aug. 2, 2016 for the corresponding international application No. PCT/JP2016/062894 (and English translation).

* cited by examiner

FIG. 7

AIR-CONDITIONING APPARATUS

CROSS REFERENCE TO RELATED APPLICATION

This application is a U.S. national stage application of PCT/JP2016/062894 filed on Apr. 25, 2016, the contents of which are incorporated herein by reference.

TECHNICAL FIELD

The present invention relates to an air-conditioning apparatus configured to control a rotation speed of a compressor based on a difference between a setting temperature and an indoor air temperature.

BACKGROUND ART

Conventionally, an air-conditioning apparatus includes a refrigeration cycle formed by connecting a compressor, an outdoor heat exchanger, an expansion valve, and an indoor heat exchanger in circuit. Such an air-conditioning apparatus includes a sensor configured to detect a temperature of a room in which the air-conditioning apparatus is installed, and performs control to obtain a difference between a setting temperature set by a user and the indoor air temperature detected by the sensor and change a rotation speed of the compressor such that the indoor air temperature reaches the setting temperature.

Specifications of a building where the air-conditioning apparatus is installed are diverse. For example, buildings built in hot areas and cold areas may be formed of building materials excellent in airtightness and thermal insulation. An air conditioning load of such buildings is relatively lower than that of other general buildings. Also, the air conditioning load varies depending on a design of the building and an installation position of the air-conditioning apparatus. Furthermore, even with the same building, the air conditioning load varies depending on an outdoor air condition. Therefore, it is required for the air-conditioning apparatus to appropriately control air-conditioning according to the air conditioning load of an environment in which it is installed.

Patent Literature 1 discloses an air-conditioning apparatus that corrects a lower limit value of an operation frequency of a compressor in response to occurrence of thermostat off and performs control to return the lower limit value to the value before correction according to subsequent change in the air conditioning load.

CITATION LIST

Patent Literature

Patent Literature 1: Japanese Unexamined Patent Application Publication No. 2008-196766

SUMMARY OF INVENTION

Technical Problem

However, to ensure quality, the compressors have lowest operable frequencies determined in advance. Therefore, when the compressor is already operated at the lowest frequency, the air conditioning load may not be appropriately covered any more by the control of Patent Literature 1. For example, in a case where an indoor load is extremely low as in a highly-airtight and highly-thermal insulating house, with the air-conditioning apparatus in Patent Literature 1, when the indoor air temperature reaches a temperature at which a thermostat is turned off, and such turning off is immediately after startup and before the operation frequency is corrected, the compressor may be turned activation/deactivation (on/off) frequently at short time intervals, and repeatedly. This phenomenon will rise power consumption, problematically.

The present invention is made to overcome the above problems, and an object thereof is to provide an air-conditioning apparatus that can perform air-conditioning according to a required load of an air-conditioned space and can perform air conditioning according to a situation of an installation place.

Solution to Problem

An air-conditioning apparatus according to an embodiment of the present invention is a compressor, an outdoor heat exchanger, an expansion valve, and an indoor heat exchanger are connected in a circuit, the air-conditioning apparatus comprising: an indoor air temperature sensor configured to detect an indoor air temperature of a space in which the air-conditioning apparatus is installed; and a controller configured to control a rotation speed of the compressor such that the indoor air temperature of the space reaches a setting temperature of the air-conditioning apparatus, wherein the controller is configured to, when the compressor is stopped and not operating during heating operation of the air-conditioning apparatus and a decrease amount of the indoor air temperature detected by the indoor air temperature sensor at a preset first time interval is equal to or smaller than a first threshold, decrease the rotation speed of the compressor at next operation of the compressor by a predetermined amount, from the rotation speed before the stop of the compressor.

Advantageous Effects of Invention

According to the air-conditioning apparatus of an embodiment of the present invention, the compressor is controlled based on an operation state of the compressor and a change amount of the indoor air temperature detected by an indoor air temperature sensor. Therefore, it is possible to perform air-conditioning control conforming to the air conditioning load, suppress power consumption of the air-conditioning apparatus, and improve comfort.

DESCRIPTION OF EMBODIMENTS

Hereinafter, an embodiment of an air-conditioning apparatus according to the present invention will be described in detail with reference to the drawings. Meanwhile, the present invention is not limited by the embodiments described below. Also, in the following drawings, the size of each component is different from that of the actual device in some cases.

First Embodiment

Figure 1:
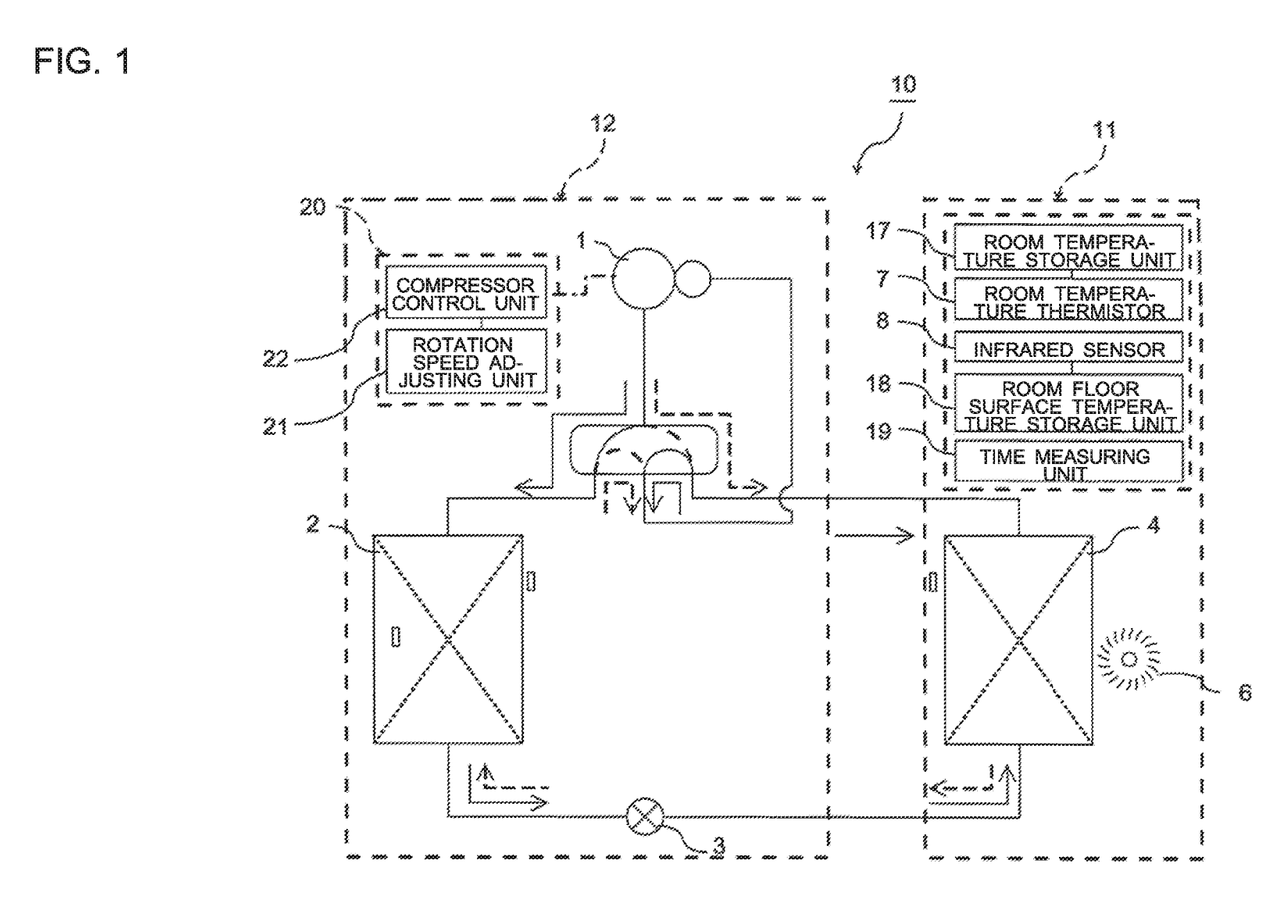
FIG. 1 is a configuration diagram of an air-conditioning apparatus according to a first embodiment of the present invention.

FIG. 1 is a configuration diagram of an air-conditioning apparatus according to a first embodiment of the present invention. An air-conditioning apparatus 10 illustrated in FIG. 1 is provided with an indoor unit 11 and an outdoor unit 12. The indoor unit 11 includes an indoor heat exchanger 4, a blower fan 6 configured to send air to a room in which the indoor unit 11 is installed, an indoor air temperature thermistor 7 configured to detect temperature in the room, an indoor air temperature storage unit 17 configured to store a detection result of the indoor air temperature thermistor 7, an infrared sensor 8 configured to detect temperature of a floor surface in the room, a room floor surface temperature storage unit 18 configured to store a detection result of the infrared sensor 8, and a time measuring unit 19. When operation of the air-conditioning apparatus 10 is started, the time measuring unit 19 starts counting predetermined time intervals Δt1 and Δt2. Every time the time measuring unit 19 counts the time interval Δt1, the indoor air temperature detected by the indoor air temperature thermistor 7 is stored in the indoor air temperature storage unit 17. Similarly, every time the time measuring unit 19 counts the time interval Δt2, the floor surface temperature detected by the infrared sensor 8 is stored in the room floor surface temperature storage unit 18. The outdoor unit 12 includes a compressor 1, an outdoor heat exchanger 2, an expansion valve 3, and a controller 20. The controller 20 includes a rotation speed adjusting unit 21 configured to adjust the indoor air temperature of the room in which the indoor unit 11 is installed and a compressor controller 22 for controlling the rotation speed of the compressor 1. The compressor 1, the outdoor heat exchanger 2, the expansion valve 3, and the indoor heat exchanger 4 are connected by a refrigerant pipe to form a refrigerant circuit.

When the air-conditioning apparatus 10 performs cooling operation, a refrigerant circulates in the refrigerant circuit through a route indicated by a solid arrow in FIG. 1, and when the air-conditioning apparatus 10 performs heating operation, the refrigerant circulates in the refrigerant circuit through a route indicated by a broken arrow in FIG. 1.

For example, during the heating operation, a high-temperature and high-pressure refrigerant discharged from the compressor 1 flows into the indoor heat exchanger 4. In the indoor heat exchanger 4, the refrigerant is condensed by exchanging heat with air sucked by the indoor unit 11, expanded by the expansion valve 3, and flows into the outdoor heat exchanger 2 in a state of a low-temperature and low-pressure two-phase gas-liquid refrigerant. Then, by exchanging heat with the air sucked by the outdoor unit 12, the refrigerant evaporates and is sucked into the compressor 1 again.

The rotation speed adjusting unit 21 of the controller 20 outputs a control signal to the compressor controller 22 based on the indoor air temperature detected by the indoor air temperature thermistor 7, the floor surface temperature in the room detected by the infrared sensor 8, and setting temperature set by a user. The compressor controller 22 controls the rotation speed of the compressor 1 based on the control signal output from the rotation speed adjusting unit 21.

Figure 2:
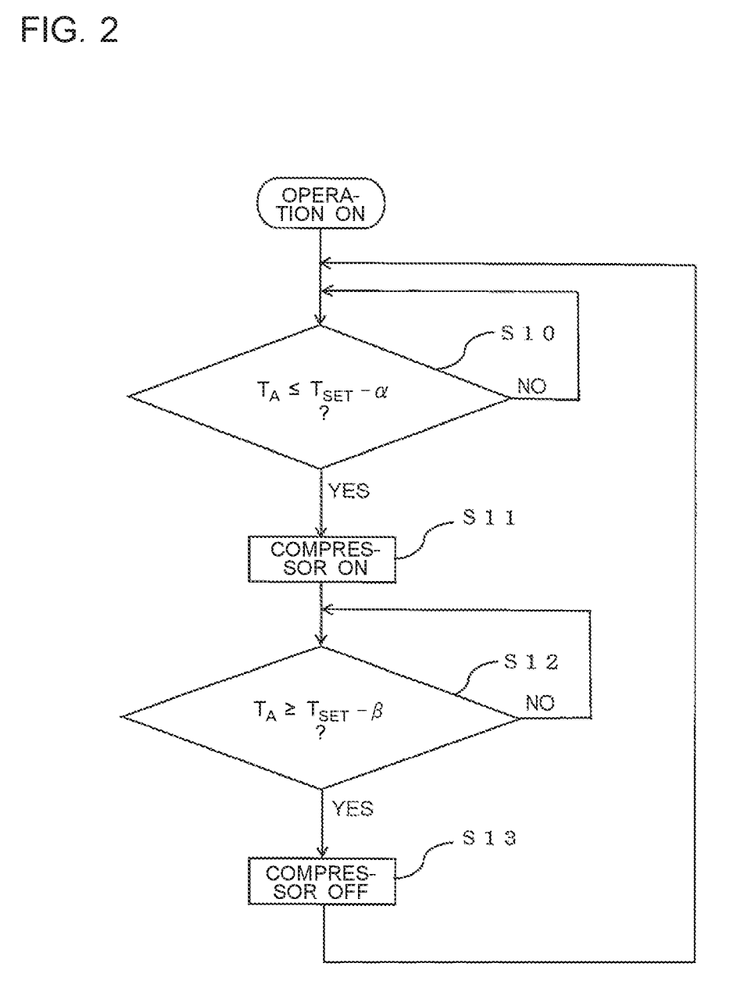
FIG. 2 is a flowchart illustrating basic operation of air-conditioning control in the first embodiment of the present invention.

FIG. 2 is a flowchart illustrating basic operation of air-conditioning control in the first embodiment of the present invention. The flowchart in FIG. 2 illustrates a procedure in the heating operation. When the operation of the air-conditioning apparatus 10 is started, the compressor 1 is in an off state. When the operation of the air-conditioning apparatus 10 is started, a difference between setting temperature $T_{SET}$ in the room set by remote control or the like by the user and indoor air temperature $T_A$ detected by the indoor air temperature thermistor 7 is checked in step S10. Specifically, it is checked whether the indoor air temperature $T_A$ is equal to or lower than a value obtained by subtracting an operation threshold α from the setting temperature $T_{SET}$. When it is confirmed that the indoor air temperature $T_A$ is equal to or lower than the value obtained by subtracting the operation threshold α from the setting temperature $T_{SET}$, the process proceeds to step S11. In this case, it is necessary to bring the indoor air temperature $T_A$ close to the setting temperature $T_{SET}$. Therefore, in step S11, a signal instructing the compressor controller 22 to turn on the compressor 1 is output from the rotation speed adjusting unit 21, an on signal is output from the compressor controller 22 to the compressor 1, and the compressor 1 is turned on. On the other hand, in step S10, when the indoor air temperature $T_A$ is higher than the value obtained by subtracting the operation threshold α from the setting temperature $T_{SET}$, even if the indoor air temperature $T_A$ is lower than the setting temperature $T_{SET}$, this is not such that the operation of the compressor 1 is started to increase the indoor air temperature $T_A$. Therefore, if it is confirmed that the difference between the setting temperature $T_{SET}$ and the indoor air temperature $T_A$ is smaller than the operation threshold α, the process does not proceed to step S11, a non-operating state of the compressor 1 is continued, and the process in step S10 is repeated.

When the compressor 1 is turned on in step S11, the indoor air temperature increases. In step S12, a difference between the setting temperature $T_{SET}$ and the indoor air temperature $T_A$ detected by the indoor air temperature thermistor 7 after the compressor 1 is turned on is checked. Specifically, it is checked whether the indoor air temperature $T_A$ is equal to or higher than a value obtained by subtracting a stop threshold β from the setting temperature $T_{SET}$. When it is confirmed that the indoor air temperature $T_A$ is equal to or higher than the value obtained by subtracting the stop threshold β from the setting temperature $T_{SET}$, the process proceeds to step S13. In this case, it is possible to determine that the indoor air temperature $T_A$ reaches the setting temperature $T_{SET}$ and continues further increasing. Therefore, in step S13, a signal for instructing the compressor controller 22 to turn off the compressor 1 is output from the rotation speed adjusting unit 21, an off signal is output from the compressor controller 22 to the compressor 1, and the compressor 1 is turned off. On the other hand, when the indoor air temperature $T_A$ is lower than the value obtained by subtracting the stop threshold 3 from the setting temperature $T_{SET}$, there is a possibility that the increase in the indoor air temperature $T_A$ is insufficient. Therefore, in this case, the process does not proceed to step S13, an operating state of the compressor 1 is continued, and the process in step S12 is repeated.

The setting temperature $T_{SET}$ is set to 24 degrees C., the operation threshold α is set to +0.5 degrees C., and the stop threshold β is set to −0.5 degrees C. At that time, when the detected indoor air temperature $T_A$ is 23.5 degrees C. or lower, the operation of the compressor 1 is started, and when the indoor air temperature $T_A$ is 24.5 degrees C. or higher, the operation of the compressor 1 is stopped.

Meanwhile, also during the cooling operation of the air-conditioning apparatus 10, it is determined whether to turn on the compressor 1 based on a comparison result between the indoor air temperature in a state in which the compressor 1 is turned off and the setting temperature at the time when the operation of the air-conditioning apparatus 10 is started, and it is determined whether to turn off the compressor 1 based on the comparison result between the indoor air temperature after the compressor 1 is turned on and the setting temperature. Meanwhile, in a case of the cooling operation, in a process corresponding to step S10, it is checked whether $T_A \geq T_{SET}+\alpha$ is satisfied, and in a process corresponding to step S12, it is checked whether $T_A \leq T_{SET}+\beta$ is satisfied.

Figure 3:
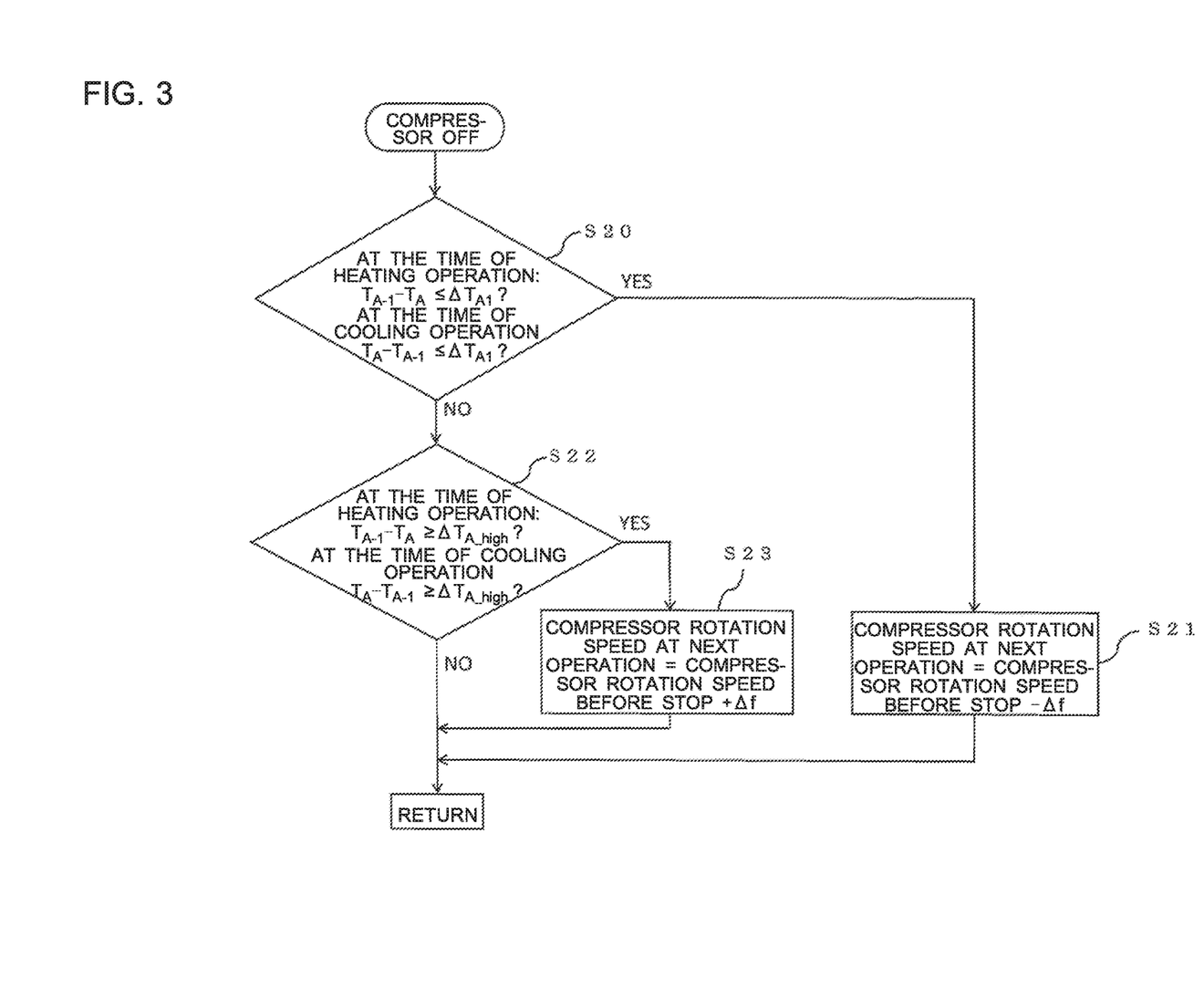
FIG. 3 is a flowchart illustrating a procedure of a subroutine performed while a compressor stops in the first embodiment of the present invention.

FIG. 3 is a flowchart illustrating a procedure of a subroutine performed while the compressor stops in the first embodiment of the present invention. In step S20, it is checked whether a difference between indoor air temperature $T_{A-1}$ detected by the indoor air temperature thermistor 7 when the time measuring unit 19 previously counts the time interval Δt1 to be stored in the indoor air temperature storage unit 17 and the indoor air temperature $T_A$ currently detected by the indoor air temperature thermistor 7 is equal to or smaller than a threshold $\Delta T_{A1}$ (first threshold, fifth threshold). In the heating operation, when the compressor 1 is not operating, the indoor air temperature $T_A$ gradually decreases, so that it is checked whether $T_{A-1}-T_A \leq \Delta T_{A1}$ is satisfied. In the cooling operation, when the compressor 1 is not operating, the indoor air temperature $T_A$ gradually increases, so that it is checked whether $T_A-T_{A-1} \leq \Delta T_{A1}$ is satisfied. When it is confirmed that the difference between the indoor air temperature $T_{A-1}$ and the indoor air temperature $T_A$ is equal to or smaller than the threshold $\Delta T_{A1}$, the process proceeds to step S21. The case where the difference between the previously stored indoor air temperature $T_{A-1}$ and the current indoor air temperature $T_A$ is equal to or smaller than the threshold $\Delta T_{A1}$ is a case where an indoor air temperature gradient while the compressor 1 is not operating (the decrease in the indoor air temperature in the heating operation, and the increase in the indoor air temperature in the cooling operation) is relatively mild. That is, it is possible to determine that an air conditioning load is low. Then, in step S21, the rotation speed adjusting unit 21 transmits a signal for decreasing the rotation speed of the compressor 1 at which the compressor 1 operates when it returns to operation by a predetermined amount Δf from the rotation speed before stop to the compressor controller 22. Meanwhile, as the threshold $\Delta T_{A1}$, the same value may be used in the heating operation and the cooling operation, or different values may be used.

For example, in the heating operation, Δt1 is set to 30 seconds, $\Delta T_A$ is set to 0.5 degrees C., Δf is set to 10 rps (revolutions per second), $T_{A-1}$ is set to 24.5 degrees C., and the rotation speed before stop of the compressor 1 is set to 60 rps. At that time, when the indoor air temperature $T_A$ detected after a lapse of 30 seconds is 24 degrees C., the rotation speed of the compressor 1 at which the operation of the compressor 1 operates when it is restarted is decreased by Δf by the process in step S21, so that this becomes 50 rps (60 rps−10 rps).

In step S20, when it is confirmed that the difference between the previously stored indoor air temperature $T_{A-1}$ and the current indoor air temperature $T_A$ is larger than the threshold $\Delta T_{A1}$, the process proceeds to step S22. In step S22, it is checked whether the difference between the previously stored indoor air temperature $T_{A-1}$ and the current indoor air temperature $T_A$ is larger than a threshold $\Delta T_{A\_high}$ (second threshold, sixth threshold). In the heating operation, when the compressor 1 is not operating, the indoor air temperature $T_A$ gradually decreases, so that in step S22, it is checked whether $T_{A-1}-T_A \geq \Delta T_{A\_high}$ is satisfied. In the cooling operation, when the compressor 1 is not operating, the indoor air temperature $T_A$ gradually increases, so that in step S22 it is checked whether $T_A-T_{A-1} \geq \Delta T_{A\_high}$ is satisfied. In a case where the difference between the previously stored indoor air temperature $T_{A-1}$ and the current indoor air temperature $T_A$ is equal to or larger than the threshold $\Delta T_{A\_high}$, it is determined that temperature change progressing while the compressor 1 is not operating is large and the air conditioning load is high. In this case, the process proceeds to step S23, and the rotation speed adjusting unit 21 transmits a signal for increasing the rotation speed of the compressor 1 at which the compressor 1 operates when it returns to operation by a predetermined amount Δf from the rotation speed before stop, to the compressor controller 22. Meanwhile, as the threshold $\Delta T_{A\_high}$, the same value may be used in the heating operation and the cooling operation, or different values may be used.

For example, in the heating operation, Δt1 is set to 30 seconds, $\Delta T_{A\_high}$ is set to 1.0 degrees C., Δf is set to 10 rps, $T_{A-1}$ is set to 24.5 degrees C., and the rotation speed before stop of the compressor 1 is set to 60 rps. At that time, when the indoor air temperature $T_A$ detected after a lapse of 30 seconds is 23.5 degrees C., the rotation speed of the compressor 1 at which the operation of the compressor 1 operates when it is restarted is increased by Δf by a process in step S25, so that this becomes 70 rps (60 rps+10 rps).

As described above, while the compressor 1 is not operating, when, in the case of the heating operation, the gradient (increase) of the indoor air temperature is small in the case of the cooling operation, and when the gradient (decrease) of the indoor air temperature is small, it is determined that the air conditioning load is low. Then, a process of decreasing the rotation speed of the compressor 1 by a predetermined amount is executed. Also, while the compressor 1 is not operating, when the gradient of the indoor air temperature is large, it is determined that the air conditioning load is high, and a process of increasing the rotation speed of the compressor 1 at which the compressor 1 operates when it returns to operation by a predetermined amount is executed.

Figure 4:
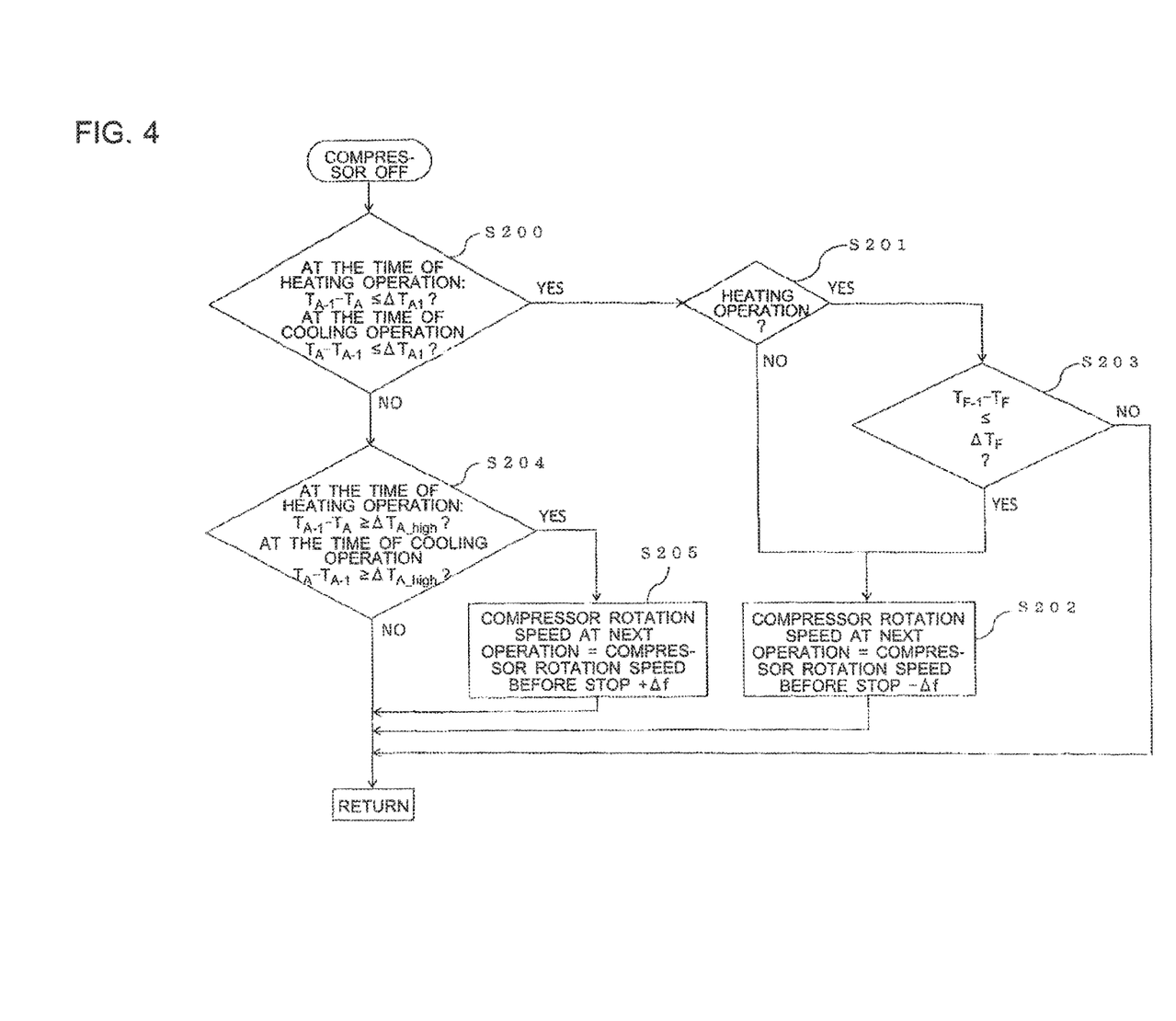
FIG. 4 is a flowchart illustrating a modification of the subroutine performed while the compressor stops in the first embodiment of the present invention.

FIG. 4 is a flowchart illustrating a modification of the subroutine performed while the compressor stops in the first embodiment. In step S200, a process similar to that in step S20 in the flowchart illustrated in FIG. 3 is performed. That is, it is checked whether the difference between the previously stored indoor air temperature $T_{A-1}$ and the current indoor air temperature $T_A$ is not larger than the threshold $\Delta T_{A1}$. When it is confirmed that the difference between the indoor air temperature $T_{A-1}$ and the indoor air temperature $T_A$ is equal to or smaller than the threshold $\Delta T_{A1}$, the process proceeds to step S201. In step S201, it is checked whether the air-conditioning apparatus 10 is in the heating operation. If it is confirmed that the air-conditioning apparatus 10 is not in the heating operation but in the cooling operation, the process proceeds to step S202. The case where the air-conditioning apparatus 10 is in the cooling operation and the difference between the indoor air temperature $T_{A-1}$ and the indoor air temperature $T_A$ is equal to or smaller than the threshold $\Delta T_{A1}$ is a case where the gradient of the indoor air temperature (the increase in the indoor air temperature) while the compressor 1 is not operating) is relatively mild. That is, it is possible to determine that the air conditioning load is low. Therefore, in step S202, a process similar to that in step S21 in the flowchart in FIG. 3 is executed. That is, the rotation speed adjusting unit 21 transmits a signal for decreasing the rotation speed of the compressor 1 at which the compressor 1 operates when it returns to operation by a predetermined amount $\Delta f$ from the rotation speed before stop to the compressor controller 22.

When it is confirmed in step S201 that the air-conditioning apparatus 10 is in the heating operation, the process proceeds to step S203. In the case of the heating operation, it is conceivable that air current does not reach the floor surface in the room in which the indoor unit 11 is installed and warm air stays in the vicinity of a ceiling of the room. In this case, the indoor air temperature detected by the indoor air temperature thermistor 7 gently decreases, whereas the floor temperature detected by the infrared sensor 8 rapidly decreases. On the other hand, in a case where a difference between floor surface temperature $T_{F-1}$ stored in the room floor surface temperature storage unit 18 when the time measuring unit 19 previously counts the time interval $\Delta t2$ and floor surface temperature $T_F$ currently detected by the infrared sensor 8 is equal to or smaller than a threshold $\Delta T_F$ (fourth threshold) is a case where a gradient of the floor surface temperature while the compressor 1 is not operating is relatively mild. In this case, it is possible to determine that the air conditioning load is low. In step S203, when the difference between the floor surface temperature $T_{F-1}$ and the floor surface temperature $T_F$ currently detected by the infrared sensor 8 is equal to or smaller than the threshold $\Delta T_F$, the process proceeds to step S202. In step S202, as described above, the rotation speed adjusting unit 21 transmits a signal for decreasing the rotation speed of the compressor 1 at which the compressor 1 operates when it returns to operation by $\Delta f$ from the rotation speed before stop to the compressor controller 22.

For example, a case is described in which $\Delta t2$ is set to 30 seconds, $\Delta T_F$ is set to 0.5 degrees C., $\Delta f$ is set to 10 rps, $T_{F-1}$ is set to 24.5 degrees C., and the rotation speed before stop of the compressor 1 is set to 60 rps. In this case, when the floor surface temperature $T_F$ detected after a lapse of 30 seconds is 24 degrees C., the rotation speed of the compressor 1 at which the operation of the compressor 1 operates when it is restarted is decreased by $\Delta f$ by the process in step S22, so that this becomes 50 rps (60 rps−10 rps).

In step S200, when it is confirmed that the difference between the previously stored indoor air temperature $T_{A-1}$ and the current indoor air temperature $T_A$ is larger than the threshold $\Delta T_{A1}$, the process proceeds to step S204. In step S204, a process similar to that in step S22 in the flowchart in FIG. 3 is executed. That is, it is checked whether the difference between the previously stored indoor air temperature $T_{A-1}$ and the current indoor air temperature $T_A$ is larger than the threshold $\Delta T_{A\_high}$. In a case where the difference between the previously stored indoor air temperature $T_{A-1}$ and the current indoor air temperature $T_A$ is equal to or larger than the threshold $\Delta T_{A\_high}$ and it is determined that the temperature change progressing while the compressor 1 is not operating is large and the air conditioning load is high, the process proceeds to step S205. In step S205, a process similar to that in step S23 in the flowchart in FIG. 3 is executed. That is, the rotation speed adjusting unit 21 transmits a signal for increasing the rotation speed of the compressor 1 at which the compressor 1 operates when it returns to operation by a predetermined amount $\Delta f$ from the rotation speed before stop to the compressor controller 22.

As described above, in this modification, while the compressor 1 is not operating, when the gradient (decrease) of the indoor air temperature and the gradient (decrease) of the floor surface temperature are small in the case of the heating operation, it is determined that the air conditioning load is low. Then, a process of decreasing the rotation speed of the compressor 1 by a predetermined amount is executed.

Figure 5:
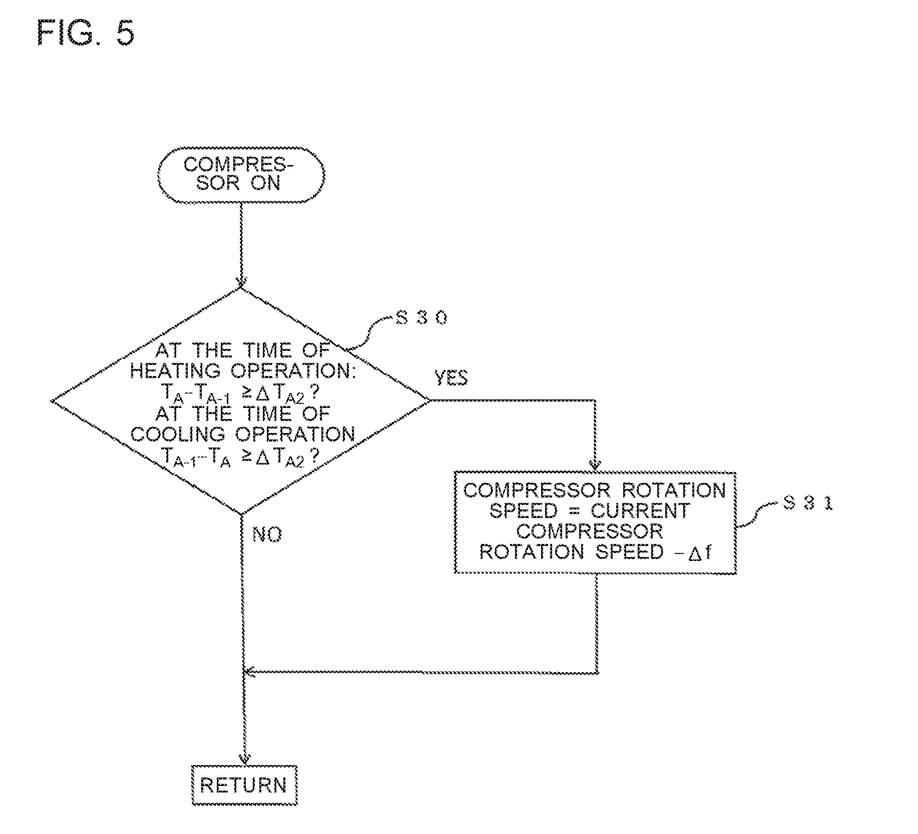
FIG. 5 is a flowchart illustrating a procedure of the subroutine performed while the compressor is operating in the first embodiment of the present invention.

FIG. 5 is a flowchart illustrating a procedure of a subroutine performed while the compressor is operating in the first embodiment of the present invention. In step S30, it is checked whether the difference between the indoor air temperature $T_{A-1}$ stored in the indoor air temperature storage unit 17 when the time measuring unit 19 previously counts the time interval $\Delta t1$ last time and the indoor air temperature $T_A$ currently detected by the indoor air temperature thermistor 7 is equal to or larger than a threshold $\Delta T_{A2}$ (third threshold, seventh threshold). In the heating operation, when the compressor 1 is operating, the indoor air temperature increases, so that it is checked whether $T_A - T_{A-1} \geq \Delta T_{A2}$ is satisfied. In the cooling operation, when the compressor 1 is operating, the indoor air temperature decreases, so that it is checked whether $T_{A-1} - T_A \geq \Delta T_{A2}$ is satisfied. When it is confirmed that the difference between the indoor air temperature $T_{A-1}$ and the indoor air temperature $T_A$ is equal to or larger than the threshold $\Delta T_{A2}$, the process proceeds to step S31. The case where the difference between the indoor air temperature $T_{A-1}$ and the indoor air temperature $T_A$ is equal to or larger than the threshold $\Delta T_{A2}$ is a case where the gradient of the indoor air temperature while the compressor 1 is operating (increase in the case of the heating operation and decrease in the case of the cooling operation) is relatively steep. That is, it is possible to determine that the air conditioning load is low. Then, in step S31, the rotation speed adjusting unit 21 transmits a signal for decreasing the rotation speed of the operation of the compressor 1 by a predetermined amount $\Delta f$ from the current rotation speed to the compressor controller 22. Meanwhile, as the threshold $\Delta T_{A2}$, the same value may be used in the heating operation and the cooling operation, or different values may be used.

For example, while the air-conditioning apparatus 10 is in the heating operation, $\Delta t1$ is set to 30 seconds, $\Delta T_{A2}$ is set to 0.5 degrees C., $\Delta f$ is set to 10 rps, $T_{A-1}$, is set to 23.5 degrees C., and the rotation speed before stop of the compressor 1 is set to 60 rps. At that time, when the indoor air temperature $T_A$ detected after a lapse of 30 seconds is 24 degrees C., the rotation speed of the compressor 1 is decreased by $\Delta f$ by a process in step S31, so that this becomes 50 rps (60 rps−10 rps).

As described above, according to the first embodiment, in addition to the process of controlling activation/deactivation (on/off) of the compressor 1 according to the difference between the setting temperature set by the user and the indoor air temperature detected by the indoor air temperature thermistor 7, the process of determining the change in the indoor air temperature and the change in the floor surface temperature while the compressor 1 is not operating and while this is operating and determining the change in the indoor air temperature and the change in the floor surface temperature while controlling the rotation speed of the compressor 1 is performed. That is, it is possible to perform highly accurate control of the compressor 1 according to an environment in the room in which the air-conditioning apparatus 10 is installed. Therefore, for example, it is possible to prevent a phenomenon that the compressor 1 is repeatedly turned activation/deactivation (on/off) at short intervals when the air conditioning load is low, and prevent unstable, frequent raise and fall of the indoor air temperature. As a result, an increase in power consumption of the air-conditioning apparatus 10 may be suppressed and comfort may be improved.

Second Embodiment

Figure 6:
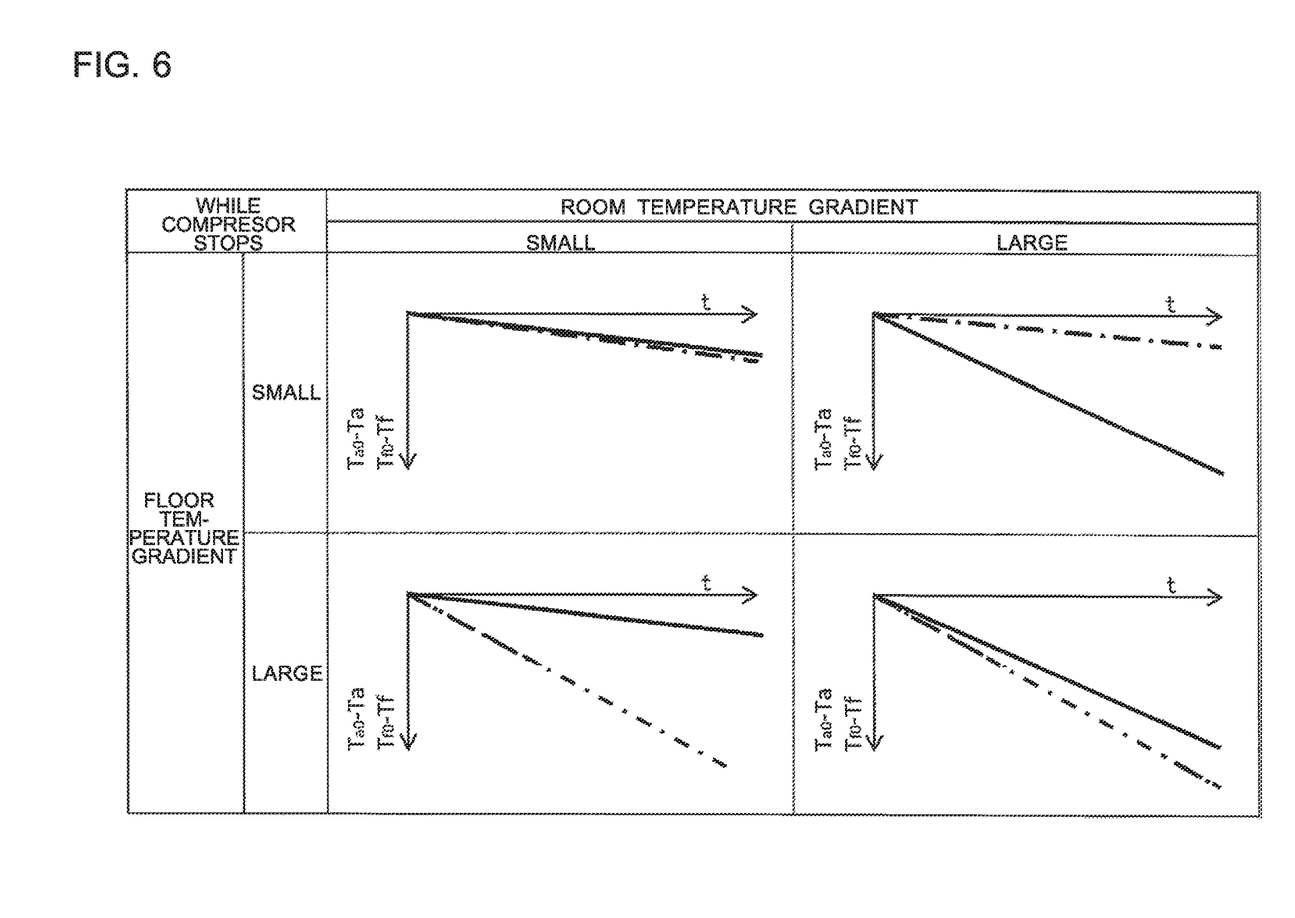
FIG. 6 is a table illustrating a condition for determining an air conditioning load while a compressor of an air-conditioning apparatus according to a second embodiment of the present invention stops.
Figure 7:
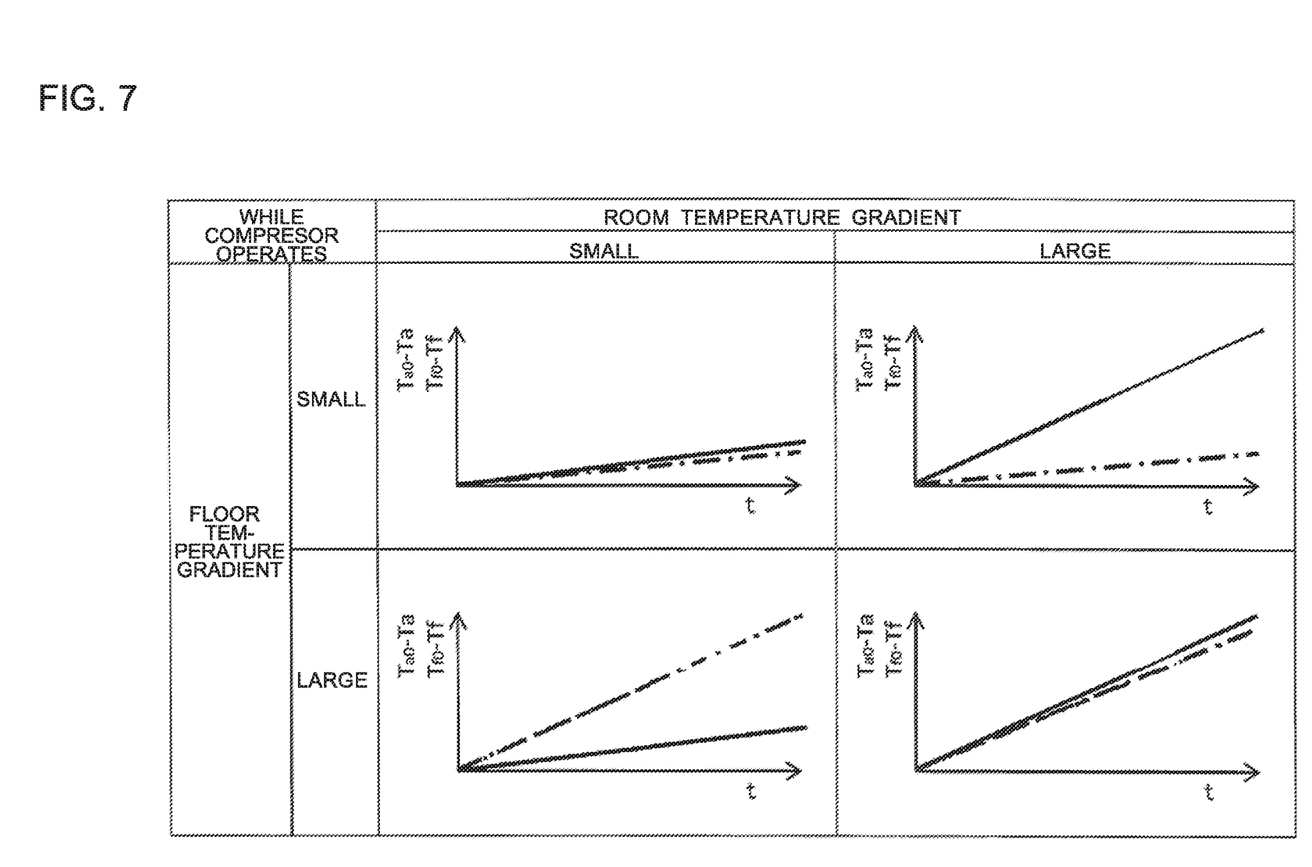
FIG. 7 is a table illustrating a condition for determining the air conditioning load while the compressor of the air-conditioning apparatus according to the second embodiment of the present invention is operating.

FIG. 6 is a table illustrating a condition for determining an air conditioning load while a compressor of an air-conditioning apparatus according to a second embodiment of the present invention stops. FIG. 7 is a table illustrating conditions for determining the air conditioning load while the compressor of the air-conditioning apparatus according to the second embodiment of the present invention is operating. The condition for determining illustrated in FIGS. 6 and 7 is applied to an air-conditioning apparatus 10 having a configuration similar to that of the first embodiment described with reference to FIG. 1. FIG. 6 illustrates the condition for determining whether the air conditioning load is high or low when the air-conditioning apparatus 10 is in heating operation and a compressor 1 stops. FIG. 7 illustrates the condition for determining whether the air conditioning load is high or low when the air-conditioning apparatus 10 is in the heating operation and the compressor 1 is operating. In a graph in each field of the tables in FIGS. 6 and 7, time is plotted along the abscissa and indoor air temperature and floor surface temperature are plotted along the ordinate. Every time a time measuring unit 19 counts a time interval Δt1, the indoor air temperature is detected by an indoor air temperature thermistor 7, and every time the time measuring unit 19 counts a time interval Δt2, the floor surface temperature is detected by an infrared sensor 8. In the graph in each field, a solid line indicates a mode in which a difference between indoor air temperature Ta0 previously detected by the indoor air temperature thermistor 7 and currently detected indoor air temperature Ta changes with time. Also, a broken line indicates a mode in which a difference between floor surface temperature Tf0 previously detected by the infrared sensor 8 and currently detected floor surface temperature Tf changes with time.

An upper left field in FIG. 6 illustrates a case where a decreasing rate of the indoor air temperature is low and a decreasing rate of the floor surface temperature is low. In other words, a case is illustrated where both a gradient of the decrease in the indoor air temperature and a gradient of the decrease in the floor surface temperature are mild and there is no significant difference between a decrease amount (change amount) of the indoor air temperature and a decrease amount of the floor surface temperature. In this case, it is determined that the air conditioning load is small. Therefore, a process of decreasing a rotation speed of the compressor 1 is performed.

An upper right field in FIG. 6 illustrates a case where the decreasing rate of the indoor air temperature is high and the decreasing rate of the floor surface temperature is low. In other words, a case is illustrated where the gradient of the decrease in the floor surface temperature is milder than the gradient of the decrease in the indoor air temperature, that is, where the change amount of the floor surface temperature is smaller than the change amount of the indoor air temperature. In this case, for example, it is conceivable that floor heating separately provided from the air-conditioning apparatus 10 is in operation, and it is determined that the air conditioning load is small. Therefore, the process of decreasing the rotation speed of the compressor 1 is performed.

A lower left field in FIG. 6 illustrates a case where the decreasing rate of the indoor air temperature is low and the decreasing rate of the floor surface temperature is high. In other words, a case is illustrated where the decrease amount in the floor surface temperature is significantly larger than the decrease amount in the indoor air temperature, that is, where the change amount of the floor surface temperature is significantly larger than the change amount of the indoor air temperature. In this case, it is determined that although the decrease in the indoor air temperature is mild, the floor surface becomes rapidly cold, and that an indoor load is large, or a warm air flow does not reach a floor surface. Therefore, a process of increasing the rotation speed of the compressor 1 or increasing a rotation speed of a blower fan 6 is executed.

A lower right field in FIG. 6 illustrates a case where the decreasing rate of the indoor air temperature is high and the decreasing rate of the floor surface temperature is high. In other words, a case is illustrated where both the gradient of the decrease in the indoor air temperature and the gradient of the decrease in the floor surface temperature are steep, that is, where both the change amount of the indoor air temperature and the change amount of the floor surface temperature are large. In this case, it is determined that the room and floor surface are rapidly cooled and the indoor load is large. Therefore, the process of increasing the rotation speed of the compressor 1 is executed.

An upper left field in FIG. 7 illustrates a case where an increasing rate of the indoor air temperature is low and an increasing rate of the floor surface temperature is low. In other words, a case is illustrated where both a gradient of an increase in the indoor air temperature and a gradient of an increase in the floor surface temperature are mild, that is, where both the change amount of the indoor air temperature and the change amount of the floor surface temperature are small. In this case, it is determined that the increase in the indoor air temperature and the increase in the floor surface temperature are insufficient and the air conditioning load is large. Therefore, a process of increasing the rotation speed of the compressor 1 is performed.

An upper right field in FIG. 7 illustrates a case where the increasing rate of the indoor air temperature is high and the increasing rate of the floor surface temperature is low. In other words, a case is illustrated where the gradient of the increase in the floor surface temperature is milder than the gradient of the increase in the indoor air temperature, that is, where the change amount of the floor surface temperature is smaller than the change amount of the indoor air temperature. In this case, since the floor surface is not sufficiently warmed, it is determined that the air conditioning load is large, or the warm air flow does not reach the floor surface. Therefore, a process of increasing the rotation speed of the compressor 1 or increasing the rotation speed of the blower fan 6 is executed.

A lower left field in FIG. 7 illustrates a case where the increasing rate of the indoor air temperature is low and the increasing rate of the floor surface temperature is high. In other words, a case is illustrated where the gradient of the increase in the floor surface temperature is steeper than that of the indoor air temperature, that is, where the change amount of the floor surface temperature is larger than the change amount of the indoor air temperature. In this case, for example, it is conceivable that floor heating separately provided from the air-conditioning apparatus 10 is in operation, and it is determined that the air conditioning load is small. Therefore, the process of decreasing the rotation speed of the compressor 1 is performed.

A lower right field in FIG. 7 illustrates a case where the increasing rate of the indoor air temperature is high and the increasing rate of the floor surface temperature is high. In other words, a case is illustrated where both the gradient of the increase in the indoor air temperature and the gradient of the increase in the floor surface temperature are steep, and there is no significant difference between an increase amount (change amount) of the indoor air temperature and an increase amount of the floor surface temperature. In this case, it is determined that the indoor air temperature and the floor surface temperature rapidly increase and the indoor load is small. Therefore, the process of decreasing the rotation speed of the compressor 1 is executed.

For example, a time interval at which the indoor air temperature and the floor surface temperature are determined is set to 30 seconds, a threshold of a ratio of the change amount of the indoor air temperature to the change amount of the floor surface temperature is set to 75%, an increase amount of the rotation speed of the compressor 1 is set to 10 rps, an increase amount of the rotation speed of the blower fan is set to 100 rpm (revolution per minute), the previously detected indoor air temperature is set to 24.5 degrees C., the floor surface temperature is set to 23.5 degrees C., the previous rotation speed of the compressor 1 is set to 60 rps, and the rotation speed of the blower fan is set to 1000 rpm. At that time, while the compressor 1 is not operating, when the indoor air temperature after a lapse of 30 seconds from the previous detection is 24 degrees C. and the floor surface temperature is 22.5 degrees C., the difference in indoor air temperature is 0.5 degrees C. (24.5 degrees C.–24 degrees C.), the difference in the floor surface temperature is 1.0 degrees C. (23.5 degrees C.–22.5 degrees C.), and the change amount of the indoor air temperature with respect to the change amount of the floor surface temperature is 0.5. That is, this is lower than the above threshold, and the decreasing rate of the floor surface temperature is extremely higher than the decreasing rate of the indoor air temperature. Therefore, it is determined that the air conditioning load is high, or the warm air flow does not reach the floor surface. In this case, a process of increasing the rotation speed of the compressor 1 at next operation to 70 rps or increasing the rotation speed of the blower fan to 1100 rpm is executed.

As described above, according to the second embodiment, during the heating operation, in both the non-operating state and the operating state of the compressor 1, the air conditioning load and a convective state of the warm air flow are determined based on the temperature gradient of the indoor air temperature and the temperature gradient of the floor surface temperature. Therefore, even when the air-conditioning apparatus 10 is installed at a high position from the floor surface, for example, the air-conditioning apparatus 10 is installed in an upper floor of a building that is entirely air-conditioned or in the middle of a stairway, it is possible to prevent a phenomenon that the compressor 1 is repeatedly turned activation/deactivation (on/off) at short intervals, to suppress hunting of the indoor air temperature, and to appropriately setting temperature of a place close to the floor surface. That is, highly accurate air conditioning control according to an environment in the room may be performed, and energy saving and comfort may be improved.

REFERENCE SIGNS LIST 1 compressor 2 outdoor heat exchanger 3 expansion valve 4 indoor heat exchanger 6 blower fan 7 indoor air temperature thermistor 8 infrared sensor 10 air-conditioning apparatus 11 indoor unit 12 outdoor unit 17 indoor air temperature storage unit 18 room floor surface temperature storage unit 19 time measuring unit 20 controller 21 rotation speed adjusting unit 22 compressor controller

The invention claimed is:

1. An air-conditioning apparatus including a refrigeration cycle in which a compressor, an outdoor heat exchanger, an expansion valve, and an indoor heat exchanger are connected in a circuit,
the air-conditioning apparatus comprising:
an indoor air temperature sensor configured to detect an indoor air temperature of a space in which the air-conditioning apparatus is installed; and
a controller configured to control a rotation speed of the compressor such that the indoor air temperature of the space reaches a setting temperature of the air-conditioning apparatus,
wherein the controller is configured to, when the compressor is stopped and not operating during heating operation of the air-conditioning apparatus and a decrease amount of the indoor air temperature detected by the indoor air temperature sensor at a preset first time interval is equal to or smaller than a first threshold, decrease the rotation speed of the compressor at next operation of the compressor by a predetermined amount, from the rotation speed before the stop of the compressor.

2. The air-conditioning apparatus of claim 1,
wherein the controller is configured to, when the compressor is not operating during the heating operation of the air-conditioning apparatus and the decrease amount of the indoor air temperature of the space is equal to or larger than a second threshold, increase the rotation speed of the compressor at the next operation of the compressor by a predetermined amount, from the rotation speed before the stop.

3. The air-conditioning apparatus of claim 1,
wherein the controller is configured to, when the compressor is operating during the heating operation of the air-conditioning apparatus and an increase amount of the indoor air temperature of the space is equal to or larger than a third threshold, decrease the rotation speed of the compressor by a predetermined amount.

4. The air-conditioning apparatus of claim 1, further comprising:
a floor surface temperature sensor configured to detect a floor surface temperature of the space in which the air-conditioning apparatus is installed, wherein
the controller is configured to, when
the air-conditioning apparatus is in the heating operation,
the compressor is not operating,
the decrease amount of the indoor air temperature of the space is equal to or smaller than the first threshold, and
a decrease amount of the floor surface temperature of the space detected by the floor surface temperature sensor at a preset second time interval is equal to or smaller than a fourth threshold, decrease the rotation speed of the compressor at the next operation by a predetermined amount, from the rotation speed before the stop.

5. The air-conditioning apparatus of claim 1,
wherein the controller is configured to,
when the compressor is not operating during cooling operation of the air-conditioning apparatus and the increase amount of the indoor air temperature detected by the indoor air temperature sensor at the preset first time interval is equal to or smaller than a fifth threshold, decrease the rotation speed of the compressor at the next operation of the compressor by a predetermined amount, from the rotation speed before the stop, when the compressor is not operating during the cooling operation of the air-conditioning apparatus, and the increase amount of the indoor air temperature of the space is equal to or larger than a sixth threshold, increase the rotation speed of the compressor at the next operation of the compressor by a predetermined amount, from the rotation speed before the stop, and when the compressor is operating during the cooling operation of the air-conditioning apparatus and the decrease amount of the indoor air temperature of the space is equal to or larger than a seventh threshold, decrease the rotation speed of the compressor by a predetermined amount.

6. The air-conditioning apparatus of claim 1,
wherein the controller is configured to control, based on whether the compressor is in an operating state or in a non-operating state, and based on a change rate of the indoor air temperature of the space detected by the indoor air temperature sensor and a change rate of a floor surface temperature of the space detected by a floor surface temperature sensor, the rotation speed of the compressor and/or a rotation speed of a blower fan configured to send air into a room in which the indoor heat exchanger is installed.

\* \* \* \* \*